United States Patent
Cho et al.

(10) Patent No.: US 6,571,781 B2
(45) Date of Patent: Jun. 3, 2003

(54) EXHAUST GAS ASSISTED FUEL INJECTION SYSTEM FOR INTERNAL COMBUSTION ENGINE

(75) Inventors: Gyu Baek Cho, Daejeon-si (KR); Dong Soo Jeong, Daejeon-si (KR)

(73) Assignee: Korea Institute of Machinery and Materials, Daejeon-si (KR)

( * ) Notice: Subject to any disclaimer, the term of this patent is extended or adjusted under 35 U.S.C. 154(b) by 95 days.

(21) Appl. No.: 09/878,194

(22) Filed: Jun. 12, 2001

(65) Prior Publication Data

US 2002/0162544 A1 Nov. 7, 2002

(30) Foreign Application Priority Data

Apr. 18, 2001 (KR) ........................................ 2001-20881

(51) Int. Cl.[7] .............................................. F02M 25/07
(52) U.S. Cl. ............................ 123/568.15; 123/568.21; 123/585
(58) Field of Search .................. 123/585, 568.15, 123/568.21, 531, 568.17, 568.18, 568.26; 60/274

(56) References Cited

U.S. PATENT DOCUMENTS 4,351,304 A * 9/1982 Schweizer .................. 123/585
4,796,594 A * 1/1989 Duret ........................ 123/531
5,205,120 A * 4/1993 Oblander et al. ............. 60/284

FOREIGN PATENT DOCUMENTS

JP 61112773 * 5/1986

* cited by examiner

Primary Examiner—Mahmoud Gimie
(74) Attorney, Agent, or Firm—Birch, Stewart, Kolasch & Birch, LLP

(57) ABSTRACT

The present invention relates to a fuel injecting apparatus for an internal combustion engine, in which exhaust gas is applied to the injection of fuel. According to the fuel injecting apparatus, a portion of hot exhaust gas is introduced in front of the outlet of the fuel injector allowing hot exhaust gas to promote the fine particle formation and vaporization of fuel thereby enhancing efficiency of fuel. Again, a portion of exhaust gas can be circulated into the combustion chamber to restrict the production of nitrogen oxide. Also, exhaust gas re-introduced into the combustion chamber through the EGR line is cooled by heat of vaporization of fuel injected from the fuel injector thereby advantageously relieving the installation of an additional cooling system for cooling exhaust gas which is re-circulated into the combustion chamber.

6 Claims, 4 Drawing Sheets

EXHAUST GAS ASSISTED FUEL INJECTION SYSTEM FOR INTERNAL COMBUSTION ENGINE

BACKGROUND OF THE INVENTION

1. Field of the Invention

The present invention relates to a fuel injecting apparatus for an internal combustion engine, and more particularly, to an exhaust gas assisted fuel injection system for an internal combustion engine in which exhaust gas re-circulated into a combustion chamber by an exhaust gas re-circulation (EGR) pipe is supplied to a fuel injector side to assist obtaining fine particles or vapor from injected fuel.

2. Description of the Related Art

In general, a system for supplying fuel into the combustion chamber adopts a PFI (Port Fuel Injection) system for injecting fuel to a suction port or a DI (Direct Injection) system for directly injecting fuel into the combustion chamber.

As the most prominent differences between the PFI system and the DI system, the PFI system carries out injection under pressure of about 3 bar while the DI system carries injection under pressure of 50 to 120 bar. Also, the PFI system is hardly influenced in injection time if a sufficient amount of time is provided for vaporization since injected fuel is introduced into the combustion chamber as mixed with air, whereas the DI system is strictly restricted in injection time for stratifying fuel within the combustion chamber.

In the DI system, since fuel is insufficiently vaporized, fuel may be burned in a droplet state or collide into a wall of a piston or the combustion chamber to produce smoke, and the $NO_x$ generating rate is fairly high since combustion takes place in a state that fuel efficiency is lowered and fuel is thin.

Also in the PFI system, fuel collides into the wall of the combustion chamber to mostly produce a liquid membrane thereby lowering fuel efficiency and deteriorating responsiveness of the engine while exerting a bad influence to exhaust gas also.

Therefore, an air assisted fuel injection system is used as an auxiliary means for the fine particle formation from fuel in the related art. The air assisted fuel injection system has promoted the fine particle formation of injected fuel by using the pressure difference before and behind a throttle. In this case, effect can be obtained in a low speed and low load range which have the large pressure difference, whereas effect can be hardly expected in a high speed range which has small pressure difference. Even though an auxiliary pump is used for obtaining the same effect in the high speed range, the auxiliary pump is not applied to an automobile in practice since power loss from pump actuation is too large.

Meanwhile, in order to reduce the amount of nitrogen oxide ($NO_x$) in exhaust gas which is harmful to human bodies, the engine of the automobile is provided with an EGR system which re-circulates a portion of exhaust gas into a suction system to lower the maximum temperature in burning a mixture thereby restricting the generation of nitrogen oxide ($NO_x$).

Such an EGR system comprises an EGR pipe for re-circulating a portion of exhaust gas released from an exhaust manifold to a suction manifold, an EGR valve installed in the middle of the EGR pipe for adjusting the amount of re-circulated exhaust gas, and a control unit for sending a control signal to the EGR valve according to operating conditions of the engine.

Also, a separate cooling system is installed in the middle of the EGR pipe at one side to reduce the temperature of circulated exhaust gas thereby restricting the generation of nitrogen oxide ($NO_x$) in the maximum amount. However, installation of such a cooling system complicates the structure of the internal combustion engine and increases cost.

SUMMARY OF THE INVENTION

The present invention is proposed to solve the problems of the related art, and it is therefore an object of the invention to provide an exhaust gas assisted fuel injection system which introduces a portion of hot exhaust gas into a fuel injector to promote the fine particle formation and the vaporization of fuel thereby enhancing efficiency of fuel and re-circulates a portion of exhaust gas into a combustion chamber allowing the generation of nitrogen oxide to be restricted.

Also, it is another object of the invention to cool circulating exhaust gas by using heat of vaporization from injected fuel, by which inconvenience of additionally installing a cooling system for reducing the temperature of circulating exhaust gas and restricting the production of nitrogen oxide may be removed thereby enhancing convenience of manufacturing and reducing cost.

According to an embodiment of the invention to obtain the objects, it is provided an exhaust gas assisted fuel injection apparatus for an internal combustion engine, comprising: a fuel injector installed in a suction port for supplying fuel to a combustion chamber of the engine; an EGR line installed between one side of an exhaust manifold of the engine and the fuel injector so that a portion of exhaust gas released from the engine surrounds fuel injected from the fuel injector thereby promoting the fine particle formation and vaporization of injected fuel; an exhaust gas injection apparatus or EGR valve installed in one side of the EGR line for regulating exhaust gas within the EGR line; and a control unit for opening/shutting the exhaust gas injection apparatus or EGR valve according to operating conditions of the engine.

BRIEF DESCRIPTION OF THE DRAWINGS

Hereinafter preferred embodiments of the invention will be described in detail in reference to the appended drawings, wherein.

DETAILED DESCRIPTION OF THE PREFERRED EMBODIMENT

Figure 1:
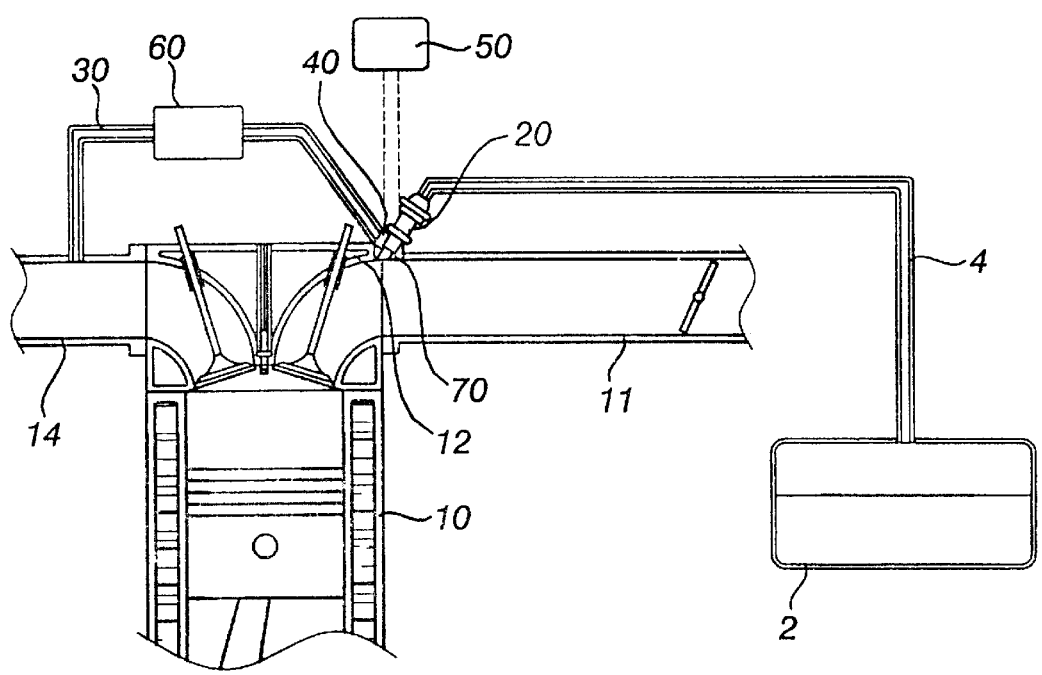
FIG. 1 is a sectional view for showing an exhaust gas assisted fuel injection system according to the first embodiment of the invention.

FIG. 1 is a sectional view for showing an exhaust gas assisted fuel injection system according to the first embodiment of the invention;

The exhaust gas assisted fuel injection system for an internal combustion engine according to the first embodiment of the invention, as shown in FIG. 1, comprises a fuel injector 20 installed in a suction port 12 for supplying fuel to a combustion chamber of the engine 10, an EGR line 30 installed between one side of an exhaust manifold 14 of the engine 10 and the fuel injector 20 so that a portion of exhaust gas released from the engine 10 surrounds fuel injected from the fuel injector 20 thereby promoting the fine particle formation and vaporization of injected fuel, an exhaust gas injection apparatus or EGR valve 40 installed in one side of the EGR line 30 for regulating exhaust gas within the EGR line 30, and a control unit 50 for opening/shutting the exhaust gas injection apparatus or EGR valve 40 according to operating conditions of the engine.

A pressure adjustor 60 is installed between the exhaust gas injection apparatus or EGR valve 40 and the exhaust manifold 14 for uniformly adjusting the pressure of exhaust gas flowing toward the exhaust gas injection apparatus or EGR valve 40 to supply the uniform pressure of exhaust gas toward the exhaust gas injection apparatus or EGR valve 40.

Figure 2:
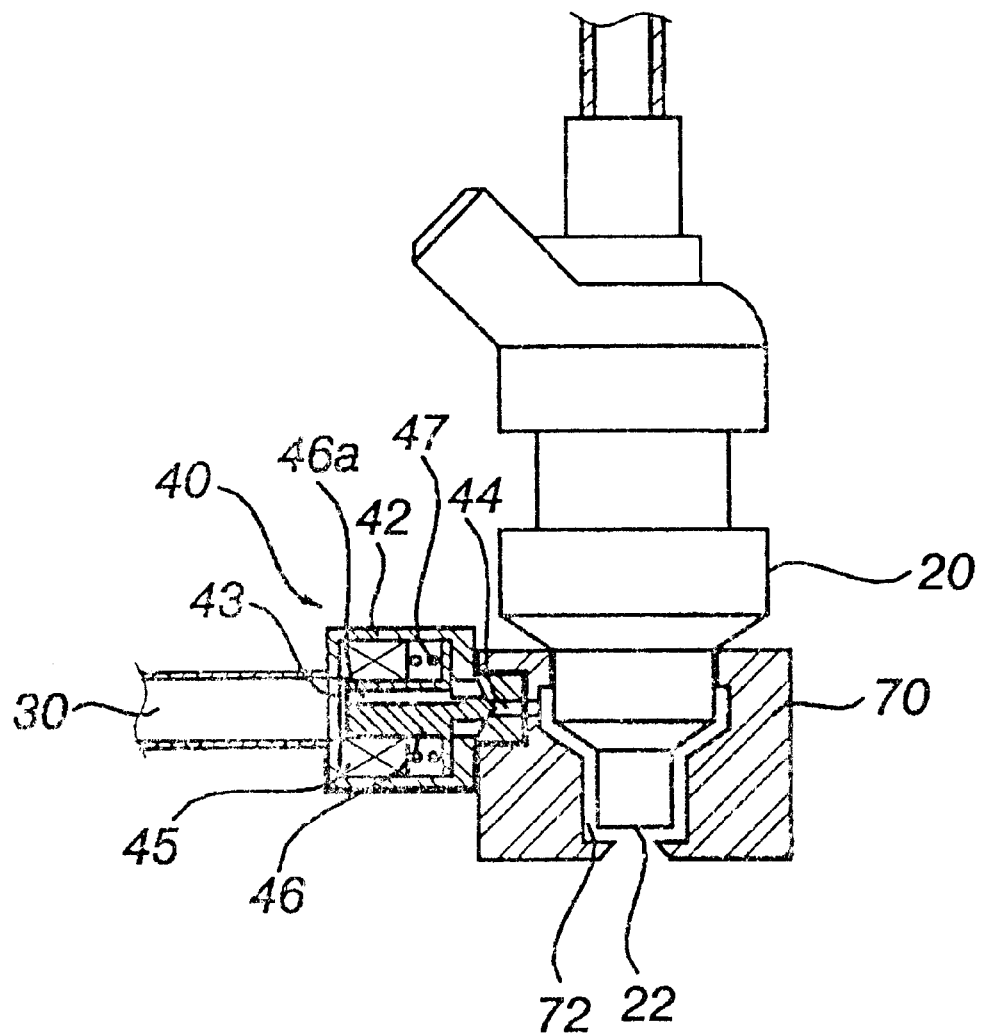
FIG. 2 is a sectional view for showing a fuel injector coupled with an EGR valve according to the first embodiment of the invention.

FIG. 2 is a sectional view for showing the fuel injector coupled with exhaust gas injection apparatus according to the first embodiment of the invention. The exhaust gas injection apparatus or EGR valve 40 comprises a valve body 42 having an inlet 43 connected to communicate with the EGR line 30 for receiving exhaust gas and an outlet 44 distanced from the fuel injector 20 for releasing exhaust gas, a solenoid 45 installed within the valve body 42 and powered in response to a signal from the control unit 50, a plunger 46 with a hole 46a for flow of exhaust gas for opening/shutting the outlet 44 while linearly reciprocating within the solenoid 45 by a magnetic field generated by the solenoid 45, and a spring 47 for providing an elastic force to the plunger 46.

Meanwhile, an outlet 22 for injecting fuel of the fuel injector 20 and the outlet 44 of the exhaust gas injection apparatus or EGR valve 40 is inserted into a housing section 70 formed in one side of the suction port 12, and the housing section 70 is provided with a communication hole section 72 communicating with the inside of the outlet 44 of the exhaust gas injection apparatus or EGR valve 40 and the suction port 12 allowing exhaust gas from the exhaust gas injection apparatus or EGR valve 40 to be introduced in front of the outlet 22 of the fuel injector 20 and then circulated into the suction port 12 with injected fuel.

The operation of the first embodiment of the invention having the foregoing configuration will be described as follows:

First, fuel is introduced into the fuel injector 20 through a pipeline 4 and the like from a fuel tank 2 during the operation of the engine 10, the fuel injector 20 injects fuel into the suction port 12 in response to the control signal of the control unit 50. Then, fuel injected like this is sucked into the combustion chamber together with air externally sucked through an air suction system 11.

Here, a portion of exhaust gas released from the combustion chamber of the engine 10 is exhausted in front of the outlet 22 of the fuel injector 20 through the EGR line 30, the pressure adjustor 60 and the exhaust gas injection apparatus or EGR valve 40 to assist fuel, which is injected through the outlet 22 of the fuel injector 20, to be formed into fine particles or vaporized.

Describing this in more detail, hot exhaust gas introduced into the EGR line 30 is uniformly adjusted in the pressure adjustor 60, and then introduced into an inlet 43 of the exhaust gas injection apparatus or EGR valve 40. Here, the control unit 50 continuously or intermittently powers the solenoid 45 in judgement of time and degree of opening/shutting the exhaust gas injection apparatus or EGR valve 40 according to the operating state of the engine and the amount of injected fuel, the plunger 46 is linearly shifted by the magnetic field of the solenoid 45, and hot exhaust gas flows through the opened outlet 44 to the inside communication hole section 72 of the housing section 70. The hot exhaust gas introduced into the communication hole section 72 is exhausted in front of the outlet 22 of the fuel injector 20 surrounding fuel, which is exhausted and injected forward, to assist the fine particle formation or vaporization of fuel, and is sucked into the combustion chamber together with the fine particles or vapor of fuel.

Meanwhile, hot exhaust gas surround fuel is introduced into the combustion chamber of the engine 10 after being cooled into a certain temperature due to heat of vaporization, so that the production of nitrogen oxide ($NO_x$) is restricted due to re-circulation effect of exhaust gas while minimizing volume efficiency degradation of sucked air.

Figure 3:
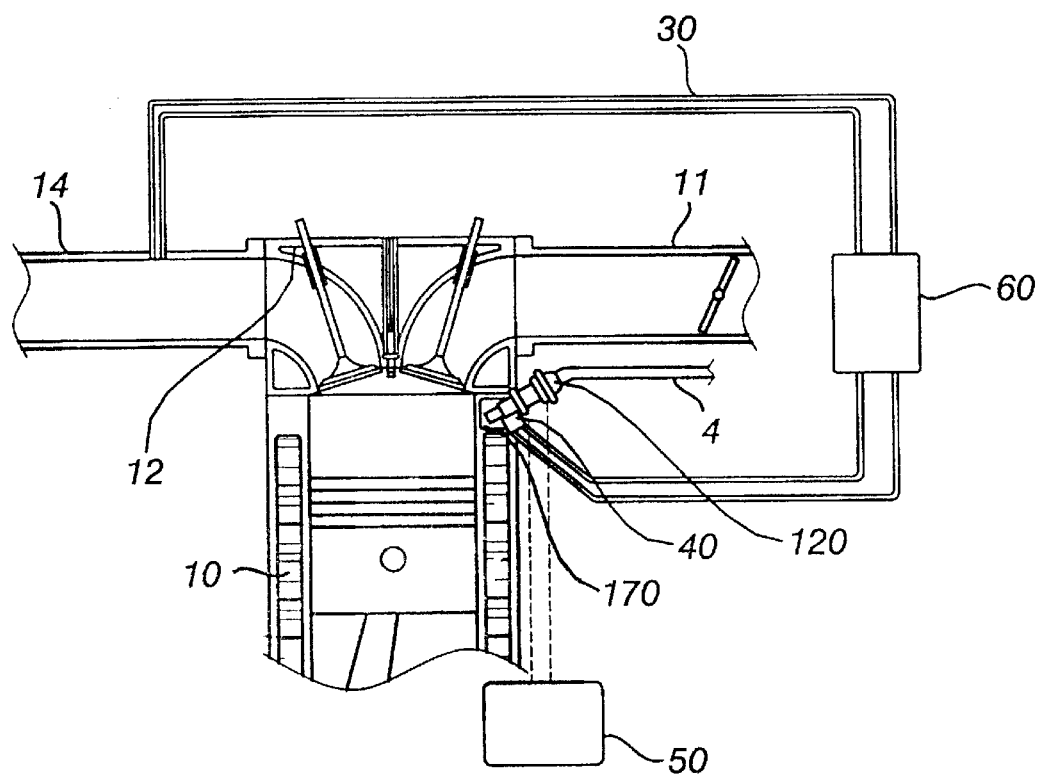
FIG. 3 is a sectional view for showing an exhaust gas assisted fuel injection system according to the second embodiment of the invention.

FIG. 3 is a sectional view for showing an exhaust gas assisted fuel injection system according to the second embodiment of the invention.

According to the second embodiment of the invention, the exhaust gas assisted fuel injection apparatus for the internal combustion engine comprises a fuel injector 120 installed in one side of a combustion chamber of the engine 10 for injecting fuel into the combustion chamber of the engine 10, an EGR line 30 installed between one side of an exhaust manifold of the engine 10 and the fuel injector 120 so that a portion of exhaust gas from the engine 10 can surround fuel, which is injected from the fuel injector 120, to promote fine particle formation or vaporization of injected fuel, an exhaust gas injection apparatus or EGR valve 40 installed in one side of the EGR line 30 for regulating exhaust gas, and a control unit 50 for opening/shutting the EGR valve according to operating conditions of the engine 10.

The EGR line 30, the exhaust gas injection apparatus or EGR valve 40 and the control unit 50 have the same structures as those of the first embodiment. Also, a pressure adjustor 60 is installed between the exhaust gas injection apparatus or EGR valve 40 and an exhaust manifold 14 for uniformly adjusting the pressure of exhaust gas flowing toward the exhaust gas injection apparatus or EGR valve 40 to supply the uniform pressure of exhaust gas toward the exhaust gas injection apparatus or EGR valve 40.

Figure 4:
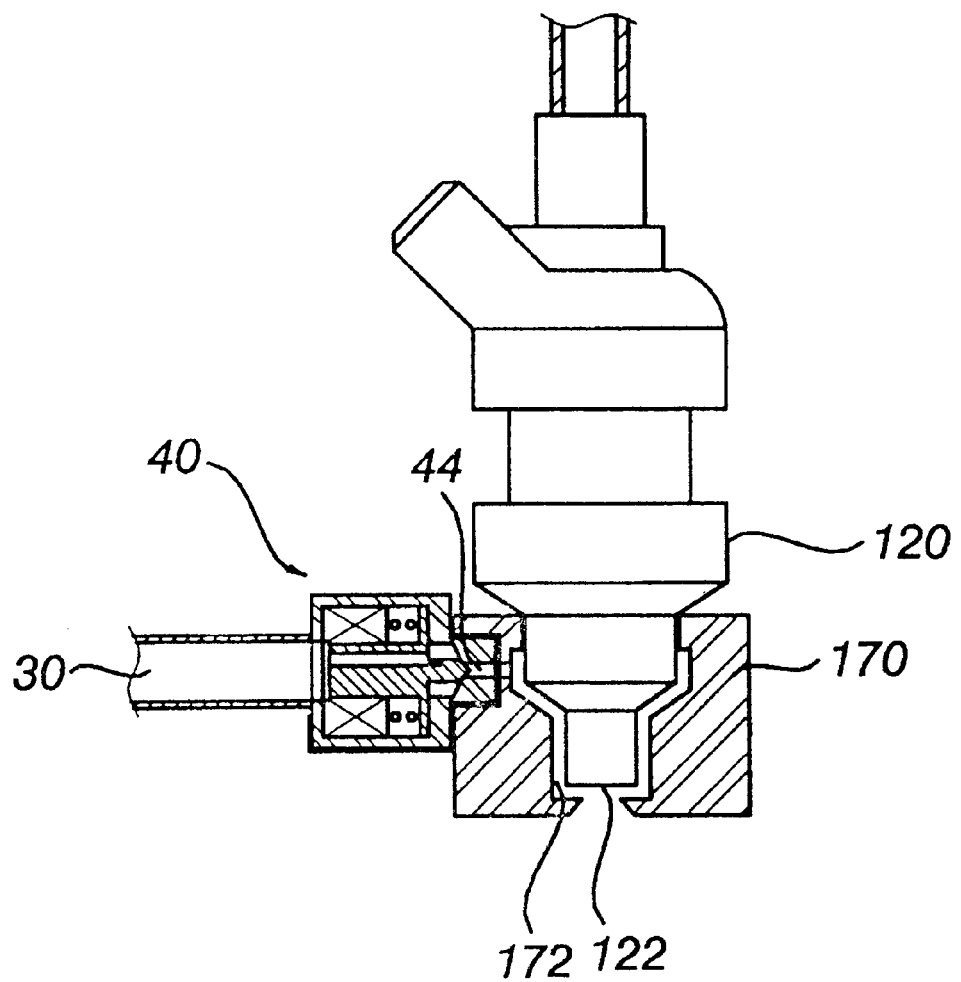
FIG. 4 is a sectional view for showing a fuel injector coupled with an EGR valve according to the second embodiment of the invention.

FIG. 4 is a sectional view for showing the fuel injector coupled with the EGR valve according to the second embodiment of the invention, in which the engine 10 is provided in one side wall with a housing section 170 into which an outlet 122 for injecting fuel of the fuel injector 120 and an outlet 44 for releasing exhaust gas of the EGR valve 40 are inserted.

The housing section 170 is provided with a cylindrical communication hole section 172 communicating with the outlet 44 of the exhaust gas injection apparatus or EGR valve 40 and the inside of the combustion chamber so that exhaust gas released from the exhaust gas injection apparatus or EGR valve 40 can be introduced in front of the outlet 122 of the fuel injector 120 and then circulated to the inside of the combustion chamber together with injected fuel.

The operation of the second embodiment of the invention having the foregoing configuration will be described as follows:

First, fuel is introduced into the fuel injector 120 through a pipeline 4 and the like from a fuel tank (not shown) during the operation of the engine 10, the fuel injector 120 injects fuel to the inside of the combustion chamber of the engine 10 in response to a control signal of the control unit 50. Then, fuel injected like this is burnt within the combustion chamber together with air externally sucked through an air suction system 11.

Here, a portion of exhaust gas released from the combustion chamber of the engine 10 is exhausted in front of the outlet 122 of the fuel injector 120 through the EGR line 30, the pressure adjustor 60 and the exhaust gas injection apparatus or EGR valve 40 to assist fuel, which is injected through the outlet a22 of the fuel injector 120, to be formed into fine particles or vaporized, and then introduced into the combustion chamber through the communication hole section 172 of the housing section 170 thereby restricting the production of nitrogen oxide ($NO_x$) in exhaust gas released from the engine.

According to the exhaust gas assisted fuel injection apparatus for the internal combustion engine of the invention having the foregoing configuration, a portion of hot exhaust gas is introduced in front of the outlet of the fuel injector allowing hot exhaust gas to promote the fine particle formation and vaporization of fuel thereby enhancing efficiency of fuel. Again, a portion of exhaust gas can be circulated into the combustion chamber to restrict the production of nitrogen oxide.

Also, exhaust gas re-introduced into the combustion chamber through the EGR line is cooled by heat of vaporization of fuel injected from the fuel injector thereby advantageously relieving the installation of an additional cooling system for cooling exhaust gas which is re-circulated into the combustion chamber.

What is claimed is:

1. An exhaust gas assisted fuel injection apparatus for an internal combustion engine, comprising:
   a fuel injector installed in a suction port for supplying fuel to a combustion chamber of the engine;
   an EGR line installed between one side of an exhaust manifold of the engine and said fuel injector so that a portion of exhaust gas released from the engine surrounds fuel injected from said fuel injector thereby promoting the fine particle formation and vaporization of injected fuel;
   an exhaust gas injection apparatus or EGR valve installed in one side of said EGR line for regulating exhaust gas within said EGR line to thereby permit a portion of the exhaust gas to be injected with the fuel into the internal combustion engine to assist in quenching of $NO_x$ gas therein; and
   a control unit for opening/shutting said exhaust gas injection apparatus or EGR valve according to operating conditions of the engine.

2. An exhaust gas assisted fuel injection apparatus for an internal combustion engine according to claim 1, wherein said exhaust gas injection apparatus or EGR valve comprises:
   a valve body having an inlet connected to communicate with said EGR line for receiving exhaust gas and an outlet distanced from said fuel injector for releasing exhaust gas;
   a solenoid installed within said valve body and being powered in response to a signal from said control unit;
   a plunger with a hole for flow of exhaust gas for opening/shutting said outlet while linearly reciprocating within said solenoid by a magnetic field generated by said solenoid; and
   a spring for providing an elastic force to said plunger.

3. An exhaust gas assisted fuel injection apparatus for an internal combustion engine according to claim 1, wherein said outlet of said exhaust gas injection apparatus or EGR valve is inserted into a housing section formed in one side of the suction port together with an outlet for injecting fuel of said fuel injector; and
   wherein said housing section is provided with a communication hole section communicating with the inside of said outlet of said exhaust gas injection apparatus or EGR valve and the suction port allowing exhaust gas from said exhaust gas injection apparatus or EGR valve to be introduced in front of said outlet of said fuel injector and then circulated into the suction port with injected fuel.

4. An exhaust gas assisted fuel injection apparatus for an internal combustion engine, comprising:
   a fuel injector installed in one side of a combustion chamber of the engine for injecting fuel into the combustion chamber of the engine;
   an EGR line installed between one side of an exhaust manifold of the engine and said fuel injector so that a portion of exhaust gas from the engine can surround fuel, said fuel being injected from said fuel injector, to promote fine particle formation or vaporization of injected fuel;
   an exhaust gas injection apparatus or EGR valve installed in one side of said EGR line for regulating exhaust gas to thereby permit a portion of the exhaust gas to be injected with the fuel into the internal combustion engine to assist in quenching of $NO_x$ gas therein; and
   a control unit for opening/shutting the EGR valve according to operating conditions of the engine.

5. An exhaust gas assisted fuel injection apparatus for an internal combustion engine according to claim 4, wherein said exhaust gas injection apparatus or EGR valve comprises:
   a valve body having an inlet connected to communicate with said EGR line for receiving exhaust gas and an outlet distanced from said fuel injector for releasing exhaust gas;
   a solenoid installed within said valve body and being powered in response to a signal from said control unit;
   a plunger with a hole for flow of exhaust gas for opening/shutting said outlet while linearly reciprocating within said solenoid by a magnetic field generated by said solenoid; and
   a spring for providing an elastic force to said plunger.

6. An exhaust gas assisted fuel injection apparatus for an internal combustion engine according to claim 4, wherein said outlet of said exhaust gas injection apparatus or EGR valve is inserted into a housing section formed in one side of the internal combustion engine together with an outlet for injecting fuel of said fuel injector; and
   wherein said housing section is provided with a communication hole section communicating with said outlet of said exhaust gas injection apparatus or EGR valve and inside of said internal combustion engine allowing exhaust gas from said exhaust gas injection apparatus or EGR valve to be introduced in front of said outlet of said fuel injector and then circulated into the inside of said internal combustion engine with injected fuel.

* * * * *